United States Patent
Carroll

(10) Patent No.: US 7,289,540 B2
(45) Date of Patent: Oct. 30, 2007

(54) METHOD AND APPARATUS FOR ALIGNING TIMING INTERVALS ACROSS COMMUNICATION SYSTEM CHANNELS

(75) Inventor: Martin D. Carroll, Watchung, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1040 days.

(21) Appl. No.: 10/388,981

(22) Filed: Mar. 14, 2003

(65) Prior Publication Data

US 2004/0179543 A1    Sep. 16, 2004

(51) Int. Cl.
    *H04J 3/06*      (2006.01)
(52) U.S. Cl. ...................................... 370/504
(58) Field of Classification Search ............... 370/480, 370/503, 504
See application file for complete search history.

(56) References Cited

U.S. PATENT DOCUMENTS

| | | | |
|---|---|---|---|
| 6,940,874 B2 * | 9/2005 | Ruszczyk et al. ........... | 370/516 |
| 2004/0184472 A1 * | 9/2004 | Carroll ....................... | 370/442 |

OTHER PUBLICATIONS

A. Colmenares et al., "Determination of the Capacity of the Upstream Channel in Cable Networks," http://citeseer.nj.nec.com/405521.html, pp. 1-12, undated.

G. Kramer et al., "Ethernet Passive Optical Network (EPON): Building a Next-Generation Optical Access Network," IEEE Communications Magazine, pp. 66-73, Feb. 2002.

Y-D. Lin et al., "An Investigation into HFCMAC Protocols: Mechanisms, Implementation, and Research Issues," IEEE Communications Surveys, http://www.comsoc.org/pubs/surveys, pp. 2-13, 2000.

W-M. Yin et al., "Two-Phase Minislot Scheduling Algorithm for HFC QoS Services Provisioning," IEICE Trans. Commun., vol. E85-B, No. 3, pp. 582-593, Mar. 2002.

\* cited by examiner

*Primary Examiner*—Melvin Marcelo

(57) ABSTRACT

Techniques for aligning timing intervals across channels of a communication system, where each of the channels includes a number of cyclically-recurring time slots, each of the timing intervals includes one or more of the time slots, and each of the channels has one or more of the timing intervals associated therewith. A first one of the timing intervals, associated with a first one of the channels, is scheduled starting at a particular time slot of the first channel. One or more other timing intervals associated with the first channel are then scheduled by providing a specified inter-interval gap between timing intervals of each of one or more pairs of the timing intervals associated with the first channel. The scheduled timing intervals for the first channel are then copied to one or more of the other channels to provide alignment of the timing intervals across the channels. The timing intervals in an illustrative embodiment are initial-maintenance intervals (IMIs) of upstream channels in a DOCSIS-compliant CATV system.

20 Claims, 6 Drawing Sheets

```
generateMAP (u, t)
1.    n = selectN (u, t)
2.    advanceM (u, n)
3.    initializeMAPFromSchedule (u, n)
4.    finishMAP (u)
```

```
align (C)
1.      synchronize all the channels in C
2.      determine the values for Z, Zhat, and G
3.      schedule the IMIs for one arbitrarily chosen channel u in C
4.      for all other channels x in C
5.          copy u's IMIs into x's schedule
```

METHOD AND APPARATUS FOR ALIGNING TIMING INTERVALS ACROSS COMMUNICATION SYSTEM CHANNELS

FIELD OF THE INVENTION

The present invention relates generally to communication systems, and more particularly to techniques for aligning timing intervals across multiple channels of such systems.

BACKGROUND OF THE INVENTION

In many communication system applications, it is important to provide alignment between particular timing intervals across multiple communication channels. One such application is in aligning timing intervals associated with different upstream data transmission channels in a cable television system, also commonly referred to as a community access television (CATV) system, as will be described below.

In a CATV system, cable modems (CMs) communicate with a cable-modem termination system (CMTS) over a CATV network. The cable-industry-backed standard that specifies how a CM and CMTS communicate with each other is called DOCSIS (Data Over Cable Service Interface Specification), and is described in the DOCSIS specification documents, which are incorporated by reference herein.

A DOCSIS-compliant network is frequency-division multiplexed (FDM) into one or more downstream (CMTS-to-CM) and one or more upstream (CM-to-CMTS) channels, with each channel corresponding to one FDM frequency. Data sent on a downstream channel is physically broadcast to all CMs that can receive that channel, and each CM picks off the packets that are intended for that CM. During normal operation a CM listens on only one downstream channel and transmits on only one upstream channel. CMs cannot directly communicate with each other. All data sent on a given upstream channel goes to the CMTS serving that channel. A typical CMTS serves between about 500 and 2,000 CMs.

With regard to the issue of alignment of timing intervals, the DOCSIS standard requires that initial-maintenance intervals (IMIs) in certain sets of upstream channels be aligned. DOCSIS does not disclose or suggest any particular techniques by which a CMTS might provide such alignment.

A need therefore exists for techniques for aligning timing intervals in cable-modem upstream channels in a CATV system, as well as in other communication system applications.

SUMMARY OF THE INVENTION

The present invention provides techniques for aligning timing intervals in multiple channels of a communication system.

In accordance with one aspect of the invention, techniques are provided for aligning timing intervals across channels of a communication system, where each of the channels includes a number of cyclically-recurring time slots, each of the timing intervals includes one or more of the time slots, and each of the channels has one or more of the timing intervals associated therewith. A first one of the timing intervals, associated with a first one of the channels, is scheduled starting at a particular time slot of the first channel. One or more other timing intervals associated with the first channel are then scheduled by providing a specified inter-interval gap between timing intervals of each of one or more pairs of the timing intervals associated with the first channel. The scheduled timing intervals for the first channel are then copied to one or more of the other channels to provide alignment of the timing intervals across the channels.

In an illustrative embodiment of the invention, the timing intervals are initial-maintenance intervals (IMIs) of upstream channels in a DOCSIS-compliant CATV system. The timing interval alignment techniques in this embodiment may be implemented in an otherwise conventional scheduler within a cable-modem termination system (CMTS) or other processing device of the CATV system.

The timing interval alignment techniques of the invention in the illustrative embodiment provide a number of significant advantages. For example, the techniques are efficient in that they can be implemented so as to require very little processor time and memory space in order to execute, and therefore do not unduly impact the speed of MAP generation in the CMTS of the CATV system. In addition, the techniques are flexible in that they can allow any set of upstream channels to be aligned, even ones with different minislot sizes.

DETAILED DESCRIPTION OF THE INVENTION

The present invention will be illustrated herein in the context of a CATV communication system in which a plurality of cable modems (CMs) communicate over a CATV network with a cable-modem termination system (CMTS). It should be understood, however, that the present invention, although particularly well-suited for use in this CATV context, is not limited thereto. The timing interval alignment techniques of the present invention are more generally suitable for use in any communication system application in which it is desirable to provide alignment of slot-based timing intervals across multiple system channels.

Figure 1A:
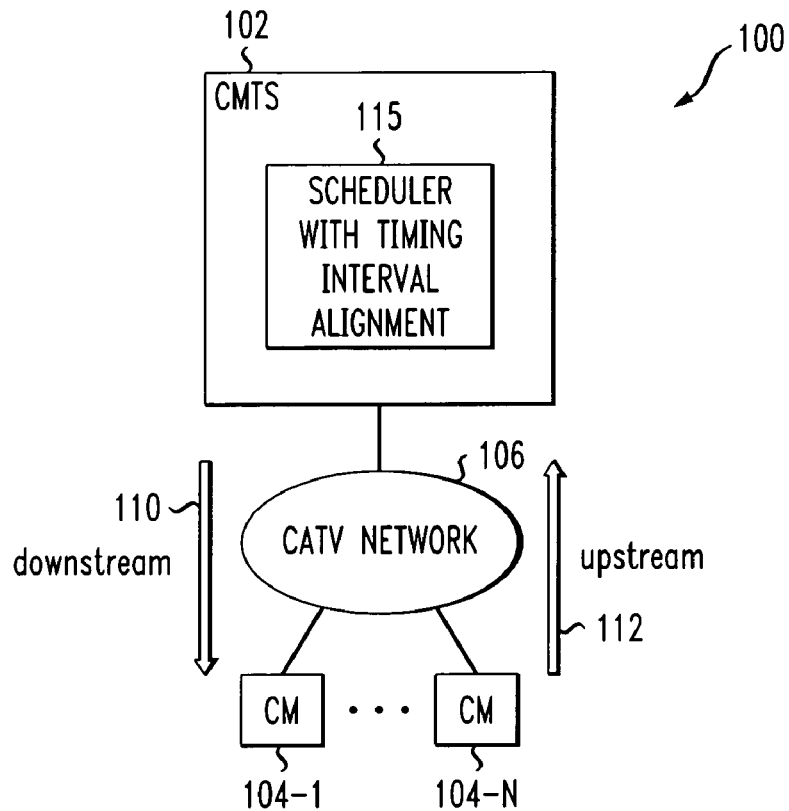
FIG. 1A shows an example CATV communication system in which the present invention is implemented.

FIG. 1A shows an example CATV system 100 in accordance with an illustrative embodiment of the invention. The system 100 includes a CMTS 102 which communicates with a plurality of CMs 104-1, 104-2, ... 104-N over a CATV network 106. More specifically, the CMTS 102 and the CMs 104 communicate via network 106 in a downstream direction 110 and in an upstream direction 112.

The CMs 104 in the system 100 may be of a conventional design. These and various other conventional aspects of the operation of the CATV system 100 are described in greater detail in, for example, J. Farmer et al., "Modern Cable Television Technology: Video, Voice, & Data Communications," Morgan Kaufmann, January, 1999, which is incorporated by reference herein, and in the above-cited DOCSIS specification documents.

In accordance with one aspect of the invention, the CMTS 102 is configured to include a scheduler 115 which provides timing interval alignment utilizing the techniques described herein. The scheduler 115 may be an otherwise conventional scheduler modified to provide timing interval alignment for upstream channels of the CATV system 100. The present invention in an illustrative embodiment thus provides techniques for aligning timing intervals across multiple upstream channels of the system 100. More specifically, the invention in an illustrative embodiment provides alignment of initial-maintenance intervals (IMIs) across multiple upstream channels, as required by the DOCSIS standard.

The timing interval alignment techniques of the present invention may be implemented at least in part in the form of software that runs in conjunction with an otherwise conventional scheduler in the CMTS 102. The CMTS 102 is thus configured to utilize the techniques of the invention to generate an upstream channel schedule in which certain timing intervals are aligned across two or more upstream channels.

Figure 1B:
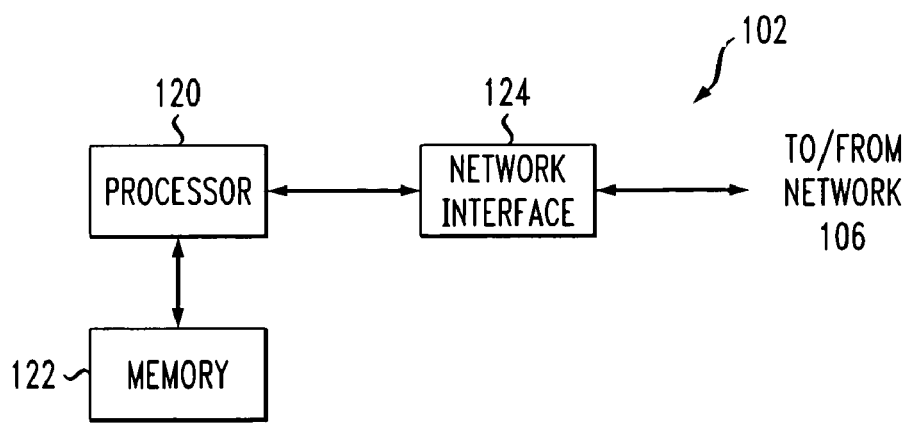
FIG. 1B is a block diagram of a processing device of the FIG. 1B system.

FIG. 1B is a simplified block diagram showing a processor-based implementation of the CMTS 102 in the FIG. 1A system. The CMTS 102 as shown comprises a processor 120 coupled to a memory 122. The device communicates over the network 106 via a network interface 124. Software for implementing the scheduler 115 of CMTS 102 and an associated timing interval alignment technique in accordance with the invention may be stored in memory 122 and executed by processor 120.

The CMTS 102 is an example of what is more generally referred to herein as a "processing device."

The processor 120 may represent a microprocessor, CPU or other processing element of a computer or other processing platform, or portions or combinations of these or other known processing elements.

Similarly, memory 122 may be implemented in a conventional manner, and may represent electronic memory, magnetic memory or other storage devices, or portions or combinations thereof. The present invention is thus not restricted in terms of the particular configuration of the processing device or devices in which it is implemented.

It is to be appreciated that the example arrangements shown in FIGS. 1A and 1B are considerably simplified for illustration purposes, and a given communication system or associated processor-based device configured in accordance with the invention may include different arrangements of elements or other elements not explicitly shown.

The CATV network 106 is assumed in the illustrative embodiment to be a DOCSIS-compliant network. As noted above, such a network utilizes an FDM technique to separate uplink and downlink channels, with each channel generally corresponding to one FDM frequency. During normal operation of the system 100, a given one of the CMs 104 listens on only one downstream channel and transmits on only one upstream channel. However, more than one CM can use a given upstream channel.

Figure 2:
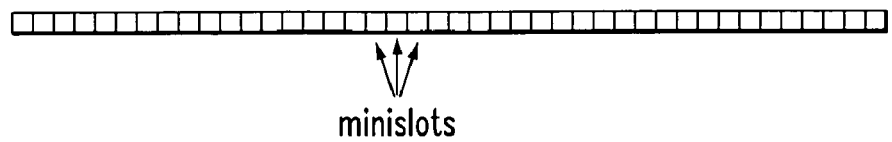
FIG. 2 illustrates upstream channel minislots in the CATV system of FIG. 1A.

Because more than one CM can use an upstream channel, a medium-access-control (MAC) protocol is needed on the upstream channels. The DOCSIS MAC protocol works as follows. First, each upstream channel is time-division multiplexed into a sequence of minislots, as illustrated in FIG. 2. Then, each CMTS schedules all the minislots in all the upstream channels that it services. An upstream schedule specifies exactly which CM (or CMs) may use which minislots, and for what purpose.

Although the invention will be illustrated using DOCSIS minislots of the type shown in FIG. 2, the described techniques are more generally applicable to timing intervals associated with other type of time slots. The term "time slot" as used herein is intended to include without limitation DOCSIS-compliant minislots.

Figure 3:
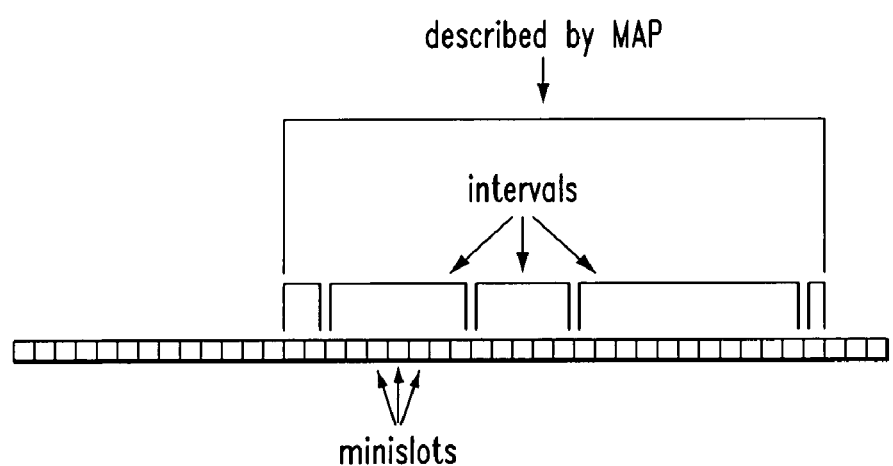
FIG. 3 illustrates the manner in which upstream channel minislots may be arranged into intervals described by MAP messages.

The CMTS 102 logically divides a given upstream channel into a contiguous sequence of intervals, as illustrated in FIG. 3, with each interval comprising a contiguous sequence of minislots. The CMTS assigns to each interval an interval type, which specifies how the CMs may use that interval. IMIs are used by CMs when the CMs first come on line.

The CMTS encodes its schedule in a sequence of upstream bandwidth allocation MAP protocol messages, also referred to herein as simply MAPs. Each MAP describes the schedule for some number of contiguous intervals, collectively covering a duration of a few milliseconds, starting at a specified time in the future. MAP generation is an operation that the CMTS typically performs hundreds of times a second and therefore should generally be as fast as possible. The CMTS periodically broadcasts, on the appropriate downstream channels, the latest MAP for each upstream channel.

As indicated previously, in some CMTS deployments, certain sets of upstream channels must be IMI aligned. A set of aligned channels in the illustrative embodiment has the property that for each IMI X mapped in any of those channels, all other channels in the set have an IMI that starts and ends at precisely the same time as X.

It should be understood, however, that the invention can be used to provide other types of alignment. The terms "align," "aligned," "alignment" and "aligning," and other similar terms utilized herein, should therefore not be construed as requiring the particular alignment precision associated with any particular illustrative embodiment.

Figure 4:
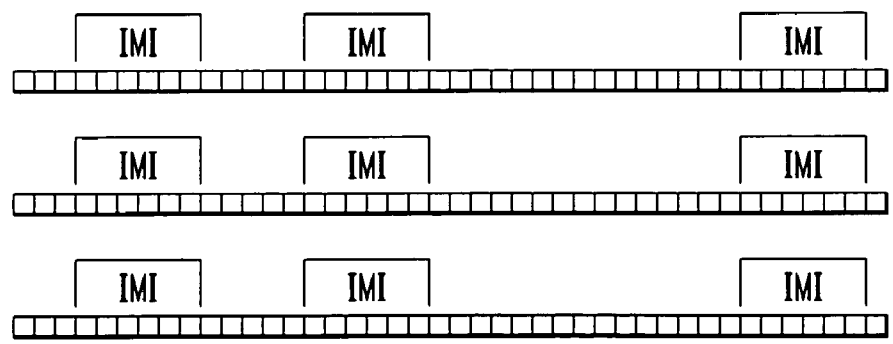
FIG. 4 shows three upstream channels with timing intervals that have been time-aligned in accordance with the techniques of the invention.

FIG. 4 shows a contiguous portion of the minislots for three aligned channels. Note that consecutive IMIs in a channel need not have the same separation. In addition, all IMIs in a channel typically have the same size, which is a function of the maximum distance from the CMTS to any CM that it serves.

Additional details of the DOCSIS protocol more particularly relating to alignment of IMIs will now be described.

The DOCSIS protocol generally requires that every upstream channel be synchronized to the CMTS master clock. The CMTS periodically sends, in each downstream channel, the current master-clock time in a sync message. All upstream channels accessible to a given CM must be synchronized to the same clock.

In the illustrative embodiment, two IMIs in different upstream channels "start and end at precisely the same time," when (1) those upstream channels are synchronized to the same clock, (2) the initial minislots of those IMIs start at precisely the same time relative to that clock, and (3) the final minislots of those IMIs end at precisely the same time relative to that clock.

To be able to send its messages at the correct times, the CM must know the round-trip propagation delay between the CMTS and the CM. The DOCSIS protocol provides a ranging mechanism, based on an initial ranging message denoted IRM, that enables the CM to determine that delay. Unfortunately, when a CM sends its IRM after coming on line, the CM does not yet know that delay. To get around this problem, the CM temporarily assumes that the delay is zero. This assumption causes the CM to send its IRM some time later than the actual beginning of the containing IMI. To prevent the IRM from colliding with other messages from other CMs, the CMTS must make each IMI large enough to account for the maximum round-trip propagation delay to any CM using that upstream channel.

DOCSIS requires that CMTS map an IMI approximately once every nominal-ranging interval (NRI). The maximum legal NRI is two seconds. The CMTS can change the NRI, typically in response to network behavior. For example, consider a neighborhood power outage. When power is eventually restored many CMs will try to come on line. To increase the rate at which the CMs come on line, the CMTS can decrease the NRI. Alternatively, the CMTS may wish to quench the load by increasing the NRI. Note that the NRI of any two aligned upstream channels must be equal. Hence, when a channel's NRI is changed, the NRI of all channels in the containing alignment class must change as well.

In DOCSIS, every upstream channel logically contains one or more unidirectional (CM-to-CMTS) flows. When a CM wishes to send a data packet or a control message (with a few exceptions, such as an IRM) to the CMTS, the CM chooses the flow in which to logically send that message. Also, DOCSIS requires that every flow have a scheduling type, which specifies how the CMTS must schedule that flow. There are five defined scheduling types: best-effort, and four other types that we will collectively refer to as non-best-effort (NBE) types. Each of the NBE types requires that the CMTS schedule periodic grants or polls (or both) for flows of that type.

A standard model of CMTS behavior will now be described with reference to FIGS. 5 and 6. The DOCSIS protocol specifies how a CMTS must behave, not how it must be implemented. In particular, DOCSIS does not specify how a CMTS actually constructs its upstream schedules. Therefore, in order to understand the internal CMTS ramifications of IMI alignment, it is necessary to assume some reasonable model of how a CMTS works. It is believed that the standard model described below is general enough to capture all practical CMTSs that are "correct," that is, fully compliant with the DOCSIS protocol.

Figures 5, 6:
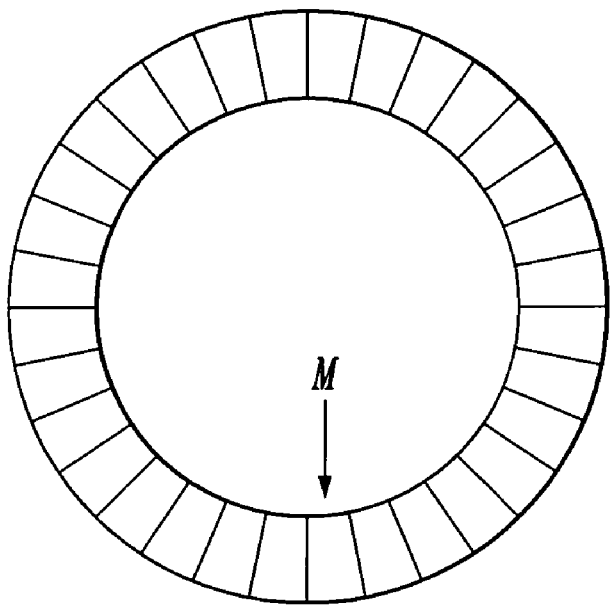
FIG. 5 is a diagram illustrating the schedule associated with a given upstream channel.
FIG. 6 shows a MAP-generation algorithm in accordance with the invention.

In the standard model, a CMTS internally maintains its schedule for a given upstream channel as a cycle of minislots as illustrated in FIG. 5. At any given time, one of the minislots M in the cycle is the next-map minislot, that is, the next mini slot to be mapped in the upstream channel. Each of the upstream channels associated with a given CMTS generally has its own cycle of minislots arranged as shown in FIG. 5. A given upstream channel in the illustrative embodiment thus comprises a plurality of cyclically-recurring minislots, and FIG. 5 shows a single cycle of the cyclically-recurring minislots for the given channel. The particular number of minislots shown in this diagram and other similar diagrams herein is exemplary only. It should also be appreciated that these diagrams are simplified for illustrative purposes.

The standard model requires that the schedule for a given upstream channel u contain all the grants and polls for u's NBE flows. If u is aligned to any other upstream channels, then the model also requires that the schedule contain all of u's IMIs. Those are the items that the model requires in the schedule. Other CMTSs may also put other items into the schedule. After scheduling all the grants, polls and IMIs, some of the minislots in the schedule may be free, that is, not contained in any such items.

Now consider what happens when the CMTS generates the next MAP for an upstream channel. In the standard model, the CMTS uses the algorithm shown in FIG. 6, where t denotes the approximate amount of time to be mapped in the upstream channel. Other similar algorithms could be used.

The operation of the FIG. 6 algorithm is as follows. In step 1, the CMTS determines the number n of minislots that the MAP will map. The value of n is chosen such that the value of n is approximately as large as the CMTS wants the MAP to be, and such that advancing the schedule's next-map pointer by n minislots will not land the next-map in the middle of an item.

In step 2, the CMTS advances the next-map minislot M by n minislots. Let S be the contiguous sequence of minislots over which M is advanced. Note that S may contain one or more grants and polls, IMIs and free intervals.

In step 3, the CMTS uses the contents of S to populate the MAP. For each item s in S, the CMTS may decide to copy s into the MAP with or without modification, or leave those minislots temporarily free in the MAP. The rules for what to copy are generally complex, but are effectively determined by the DOCSIS QoS requirements, and are therefore not described in further detail herein.

Finally, in step 4 the CMTS post-processes the MAP, typically to add more items. The implementation of finish-MAP is highly CMTS-specific. The standard model places no restrictions on how finishMAP is implemented.

Now consider an unaligned upstream channel u, that is, a channel that is not aligned to any other channel. As indicated previously, the scheduler generally must issue an IMI for u approximately once every NRI. Because the NRI need not be rigidly adhered to, the scheduler is free to schedule the IMIs either in the schedule or in finishMAP. Because scheduling IMIs in the schedule reduces the bandwidth available to NBE flows, it is believed that most schedulers schedule the IMIs for unaligned channels during finishMAP.

Now consider an upstream channel u that is aligned with another channel v. Although the NRI need not be rigidly adhered to, the alignment of u and v must be exact. To ensure exactness, the standard model requires that the CMTS schedule the IMIs for u and v in their respective schedules.

A basic timing alignment algorithm in accordance with an illustrative embodiment of the invention will now be described with reference to FIGS. 7 and 8.

Figure 7:
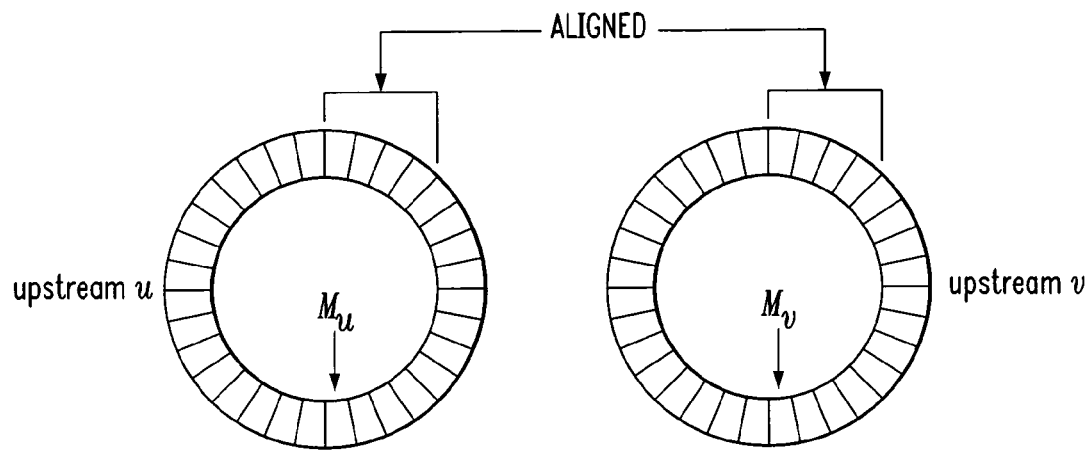
FIG. 7 illustrates an initial alignment of timing intervals in schedules for a pair of upstream channels.

Suppose that we wish to align two upstream channels u and v, the schedules for which are shown in FIG. 7. We will impose the reasonable requirement that the schedules be the same size in terms of the duration of one cycle. Let us assume that these schedules are currently empty. To make the presentation simple, assume for the moment that u and v have the same minislot size $\mu$. As noted above, u and v in the illustrative embodiment must be synchronized to the same CMTS clock. Suppose that the next-map minislots $M_u$ and $M_v$ are themselves synchronous with respect to that clock. Then it is easy to see that the two intervals indicated in FIG. 7 are aligned, as are other intervals not specifically indicated. If the next-map minislots $M_u$ and $M_v$ are not synchronous, we can make them synchronous such that the two intervals indicated in FIG. 7 are aligned, simply by mapping an appropriate number of minislots to each channel.

Figure 8:
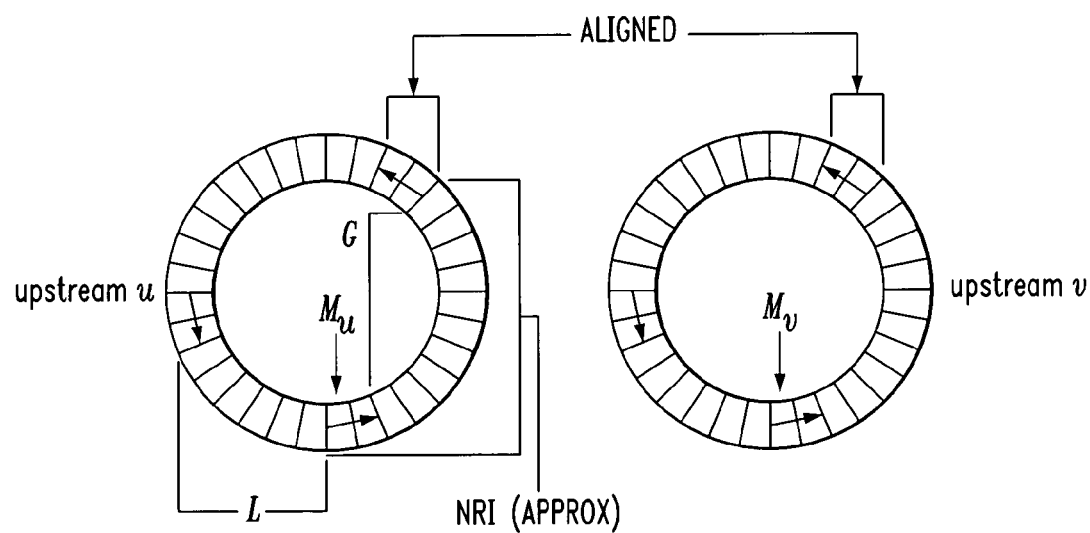
FIG. 8 shows an example of an illustrative timing interval alignment technique of the present invention as applied to a pair of upstream channels.

Referring now to FIG. 8, the operation of the basic algorithm in aligning IMIs for channels u and v will be described. To align these channels, we first determine the smallest value Z for the IMI size that is large enough for both channels. The value Z is in units of time. We round Z up to the smallest value $\hat{Z}$ that is an integer multiple of μ. We then schedule aligned IMIs as shown in FIG. 8. We schedule the first IMI starting at the next-map minislot. We separate each successive pair of IMIs by a gap G that is equal to NRI, rounded to the nearest minislot. Note that because the schedule size might not be an exact multiple of NRI, the gap between the last and the first IMI might be less than G. This difference is acceptable because the NRI is nominal. When we call initializeMAPFromSchedule during the MAP generation of FIG. 6, we copy each IMI unchanged into the MAP.

If the schedules for u and v are both nonempty before we attempt to align u and v, it is believed that scheduling their IMIs is an intractable problem. Hence, any practical alignment algorithm for the standard CMTS model must place some restrictions on what items are allowed to be present in the schedules of the channels to be aligned. The basic algorithm illustrated in conjunction with FIGS. 7 and 8 imposes the restriction that the schedules be empty. This restriction implies that all NBE flows on the channels must be deadmitted before aligning the channels. Best-effort flows need not be readmitted, but if the scheduler has put into the schedule any items related to best-effort flows, those items must be removed from the schedule and rescheduled later. It is important to note that this restriction generally does not matter in practice, because in practice alignment can almost always be performed when the channels are created, before any NBE flows are admitted on them.

Note that to dealign a channel one simply removes all the IMIs from its schedule. The CMTS can then issue IMIs for that channel during the call to finishMAP in FIG. 6.

The basic alignment algorithm described in conjunction with FIGS. 7 and 8 can be enhanced to accommodate changes in NRI. This enhancement will now be described with reference to FIG. 9.

Suppose that the CMTS wishes to change the NRI of an aligned channel u. As indicated previously, under this condition the NRI of all channels in u's alignment class must also change. To change the NRIs, we must reschedule the IMIs in all the schedules. Unfortunately, between the time that we initially aligned the channels and the time that we want to change their NRI, NBE flows might have been admitted on one or more of the channels. Admitting NBE flows causes grants and polls to be added to the schedules. It is believed that rescheduling all the IMIs in the presence of grants and polls having QoS constraints is an intractable problem.

Figure 9:
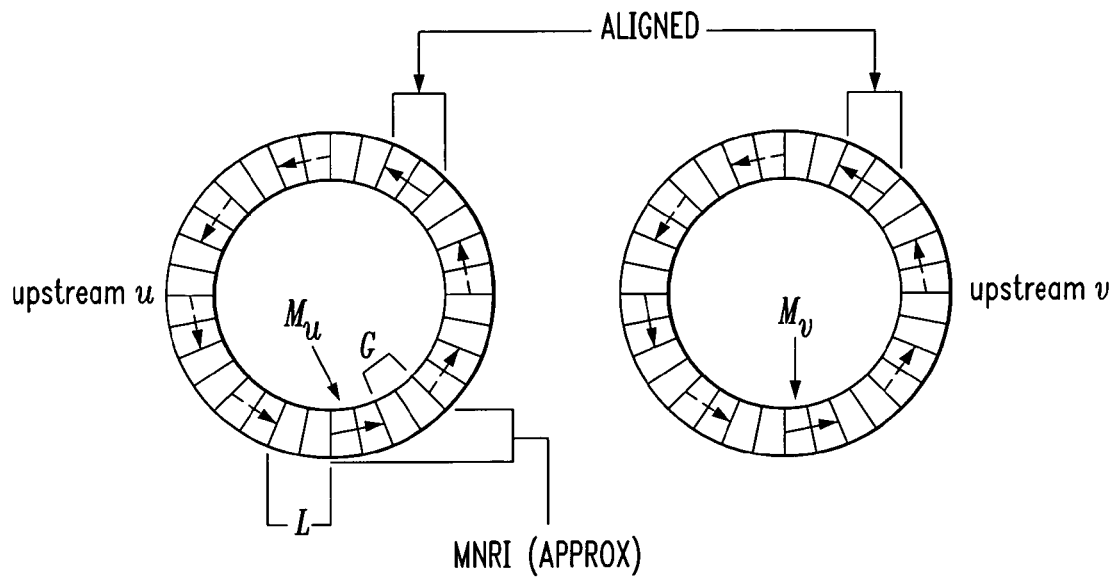
FIG. 9 illustrates an enhancement of the timing interval alignment technique of FIG. 8 to accommodate changes in NRI.

One possible alternative approach is simply to require that all NBE flows in the alignment class be readmitted before changing the class's NRI. However, NRI changes can occur frequently, and deadmitting flows is undesirable. The enhanced algorithm as illustrated in FIG. 9 provides a better approach, extending the basic algorithm so as to permit NRI changes without requiring deadmissions.

The enhanced algorithm works by associating with each alignment class a minimum nominal ranging interval (mRI), which is a lower bound on the value to which the class's NRI can be set. The mRI and NRI may be viewed as corresponding to "admitted QoS" and "activated QoS," respectively, for initial maintenance. It should be noted that this mRI is not a DOCSIS constraint. Instead, it is a constraint placed on the NRI by the alignment algorithm. Fortunately, this constraint is not onerous, because in practice there typically exists a lower bound below which the network operator will never set the NRI.

More specifically, the enhanced algorithm is generated by modifying the basic alignment algorithm as follows. When scheduling IMIs, instead of setting the inter-IMI gap G to NRI, we set it to mRI, as shown in FIG. 9. In the FIG. 9 example, the mRI is a divisor of the NRI. That property is not a requirement, but it simplifies the description and illustration of the algorithm. We then mark as activated all those IMIs that are separated by a gap of NRI. The activated IMIs are shown in FIG. 9 as solid arrows and inactivated IMIs are shown as dashed arrows. Note that we mark the same IMIs as activated in both channels. When we perform initializeMAPFromSchedule in the MAP generation process of FIG. 6, we copy an IMI from the schedule to the MAP if the IMI is activated. If the IMI is not activated, we do not copy it to the MAP. Instead, we leave its minislots temporarily free in the MAP. To change the NRI for a channel u, we simply change which IMIs are marked as activated.

Note that we can use the minislots of inactivated IMIs for scheduling best-effort flows, during finishMap. We cannot, however, use those minislots for scheduling NBE flows. If we did use those minislots for scheduling NBE flows, then whenever the network operator changed the NRI we might have to deadmit one or more NBE flows. Therefore, the more IMIs that are in the schedule, the less bandwidth available for NBE flows. To maximize the NBE bandwidth, the network operator should choose an mRI that is as large as possible.

Another enhancement to the timing interval alignment algorithm of the illustrative embodiment will now be described with reference to FIGS. 10 and 11. In this enhancement, the algorithm is generalized to accommodate channels having different minislot sizes.

Figure 10:
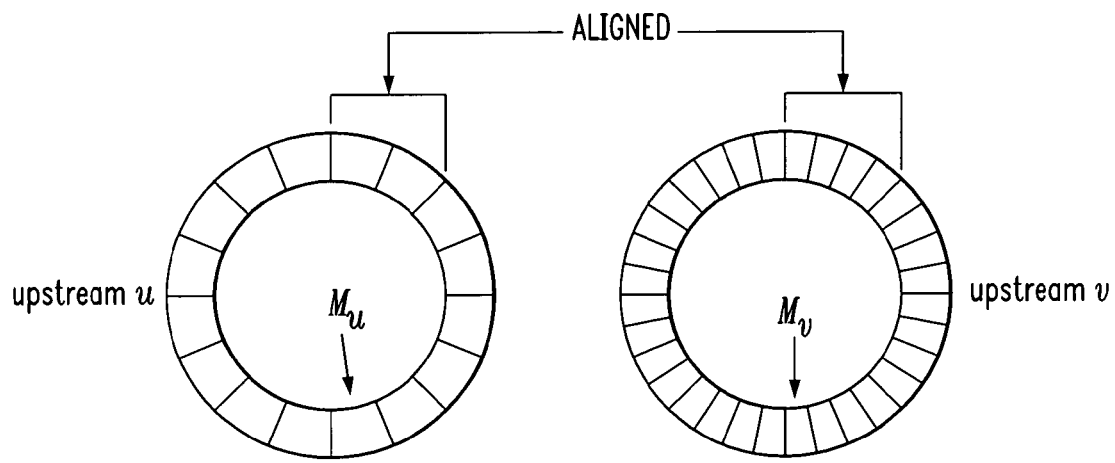
FIGS. 10 and 11 illustrate a further enhancement of the timing interval alignment technique of FIG. 9 to accommodate upstream channels having different minislot sizes.

Suppose that the two channels to be aligned have different minislot sizes $\mu_u$ and $\mu_v$, as shown in FIG. 10. Assume without loss of generality that $\mu_u$ is larger. Because the legal DOCSIS minislot sizes increase in a power-of-two progression, $\mu_u$ must be a multiple of $\mu_v$.

Recall that the basic algorithm began by determining the IMI size Z and then rounding Z up to the smallest value $\hat{Z}$ that is an integer multiple of the minislot size. If the minislot sizes differ, then we must choose a value for $\hat{Z}$ that is an integer multiple of the larger minislot size $\mu_u$. The gap G must also be a multiple of $\mu_M$. The resulting schedules are shown in FIG. 11.

Note that for these channels to be aligned, the gap L between the last and first IMI must also be a multiple of $\mu_M$. Because both $\hat{Z}$ and G are multiples of $\mu_M$, it suffices to require that the schedule size be a multiple of $\mu_M$. Because any reasonable schedule is much larger than the largest legal DOCSIS minislot size, this last restriction is easy to ensure.

Figures 11, 12:
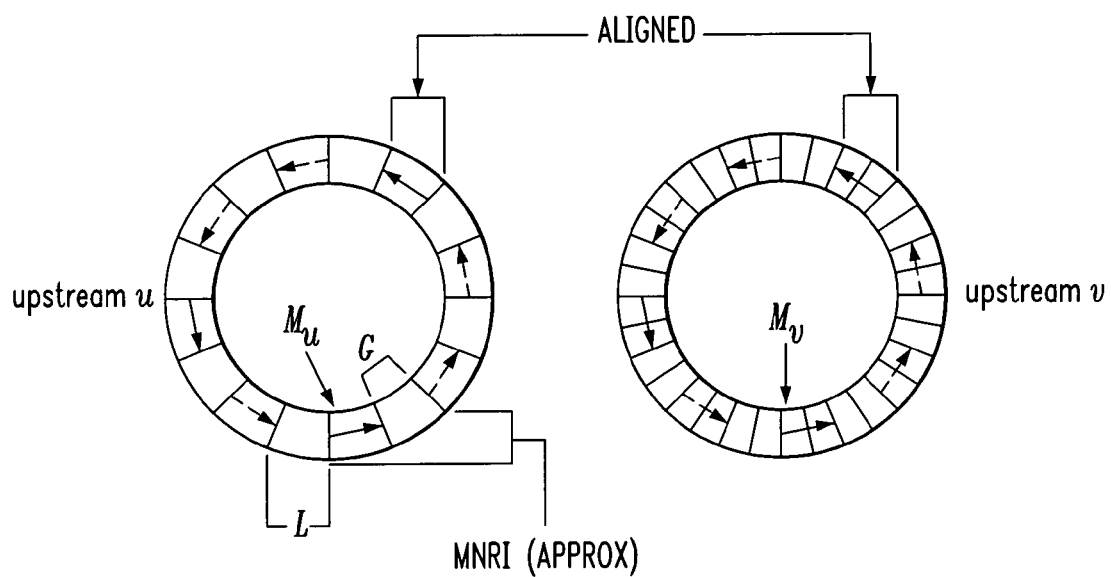
FIG. 12 shows an extension of the general two-channel alignment technique to timing interval alignment for any desired number of channels.

FIG. 12 shows a further generalization of the two-channel basic algorithms described above to timing interval alignment for any desired number of channels.

The argument C to align is the set of upstream channels to be aligned. In step 1, we make all the next-map minislots of all the channels synchronous by mapping each channel an appropriate number of minislots.

In step 2, we calculate several values. First we set Z to the smallest IMI size that is large enough for all channels in the class. Then we round Z up to the smallest value $\hat{Z}$ that is an integer multiple of the largest minislot size $\mu_C$ in the class. Finally, we set G to a value that is equal to NRI, rounded to the nearest minislot.

In step 3, we arbitrary select one of the channels u in C, and we schedule u's IMIs using the calculated values of $\hat{Z}$ and G.

In steps 4 and 5, we copy the IMIs in u's schedule into the schedules of all the other channels.

It can be shown that the example interval alignment algorithm of FIG. 12 runs in time O(s), where s is the total size of all the schedules in the alignment class. The algorithm uses O(1) space, not counting the space needed for the schedules. The algorithm does not affect the speed of MAP generation. Finally, although the algorithm reduces the bandwidth available to NBE flows, it is easy to show that it does not affect the overall bandwidth efficiency of an upstream channel.

Advantageously, the timing interval alignment techniques of the present invention as implemented in the CATV system 100 are particularly efficient and flexible. The techniques are efficient in that they can be implemented so as to require very little processor time and memory space in order to execute, and therefore do not unduly impact the speed of MAP generation. The techniques are flexible in that they can allow any set of upstream channels to be aligned, even ones with different minislot sizes.

The above-described embodiments of the invention are intended to be illustrative only. For example, although described in conjunction with the aligning of IMIs of cable-modem upstream channels in a CATV system, the techniques of the invention are more broadly applicable to the aligning of other types of timing intervals in other communication system applications. The system components described herein can be implemented using otherwise conventional arrangements of hardware, software, firmware, or combinations thereof. As noted above, the illustrative interval alignment algorithms described herein may be implemented at least in part in the form of one or more software programs which are configured to run on one or more computers or other types of processing devices associated with a CMTS or other communication system element. The particular steps in these example alignment algorithms may be varied. Furthermore, the number of timing intervals per channel, number of time slots per timing interval and other parameters can be varied. For example, a given channel may only have a single timing interval associated therewith. These and numerous other alternative embodiments within the scope of the following claims will be readily apparent to those skilled in the art.

What is claimed is:

1. A method for aligning timing intervals across a plurality of channels of a communication system, each of the channels comprising a plurality of cyclically-recurring time slots, the timing intervals each comprising one or more of the time slots, and each of the channels having one or more of the timing intervals associated therewith, the method comprising the steps of:

scheduling a first one of the plurality of timing intervals, associated with a first one of the channels, starting at a particular time slot of the first channel;

scheduling one or more other timing intervals associated with the first channel by providing a specified inter-interval gap between timing intervals of at least a given pair of the timing intervals associated with the first channel; and copying the scheduled timing intervals for the first channel to at least one other channel of the plurality of channels.

2. The method of claim 1 wherein the particular time slot of the first channel comprises a next-map time slot of the first channel.

3. The method of claim 1 further comprising the step of determining a minimum interval size for the timing intervals at least in part as a function of time slot duration.

4. The method of claim 3 wherein the minimum interval size comprises an integer multiple of a longest time slot duration among the plurality of channels.

5. The method of claim 1 wherein the first channel has a different time slot duration than at least one of the other channels.

6. The method of claim 1 wherein each of the channels initially has an empty schedule associated therewith prior to timing interval alignment.

7. The method of claim 1 wherein each of the channels is synchronized to a common clock.

8. The method of claim 1 wherein the specified inter-interval gap comprises a nominal-ranging interval of the system rounded to a nearest time slot duration of the first channel.

9. The method of claim 1 wherein the timing interval alignment is configured to accommodate changes in a nominal-ranging interval of the system.

10. The method of claim 1 wherein the specified inter-interval gap comprises a minimum nominal-ranging interval of the system, and further wherein pairs of scheduled timing intervals associated with the first channel, for which the intervals thereof are separated from one another by an amount greater than a nominal-ranging interval of the plurality of channels, are marked as activated, the pairs of scheduled timing intervals associated with the first channel that are marked as active also being marked as active in other channels to which the scheduled timing intervals of the first channel are copied.

11. The method of claim 1 wherein the specified inter-interval gap comprises an integer multiple of a largest time slot duration among the plurality of channels.

12. The method of claim 1 wherein all pairs of adjacent scheduled timing intervals associated with the first channel, other than a pair comprising the first one of the intervals of the first channel and a last one of the intervals of the first channel, are separated by the specified inter-interval gap.

13. The method of claim 12 wherein the intervals of the pair comprising the first one of the intervals of the first channel and the last one of the intervals of the first channel are separated by a time duration less than the specified inter-interval gap.

14. The method of claim 12 wherein the intervals of the pair comprising the first one of the intervals of the first channel and the last one of the intervals of the first channel are separated by an amount of time corresponding to an integer multiple of a largest time slot duration among the plurality of channels.

15. The method of claim 1 wherein the communication system comprises a DOCSIS-compliant CATV system.

16. The method of claim 1 wherein the time slots comprise minislots defined in accordance with the DOCSIS protocol.

17. The method of claim 1 wherein the copying step further comprises copying the scheduled timing intervals for the first channel into each of the other channels in the plurality of channels.

18. The method of claim 1 wherein the channels comprise upstream channels associated with cable modem to cable modem termination system communication in a CATV system, and the timing intervals comprise initial-maintenance intervals of the upstream channels.

19. An apparatus for aligning timing intervals across a plurality of channels of a communication system, each of the channels comprising a plurality of cyclically-recurring time slots, the timing intervals each comprising one or more of the time slots, and each of the channels having one or more of the timing intervals associated therewith, the apparatus comprising:
 a memory; and
 a processor coupled to the memory;
 the processor being operative to control operations associated with alignment of at least a subset of the timing intervals, the operations including scheduling a first one of the plurality of timing intervals, associated with a first one of the channels, starting at a particular time slot of the first channel; scheduling one or more other timing intervals associated with the first channel by providing a specified inter-interval gap between timing intervals of at least a given pair of the timing intervals associated with the first channel; and copying the scheduled timing intervals for the first channel to at least one other channel of the plurality of channels.

20. A computer-readable medium storing one or more software programs for use in aligning timing intervals across a plurality of channels of a communication system, each of the channels comprising a plurality of cyclically-recurring time slots, the timing intervals each comprising one or more of the time slots, and each of the channels having one or more of the timing intervals associated therewith, wherein the one or more software programs when executed in a processing device of the system implement the steps of:
 scheduling a first one of the plurality of timing intervals, associated with a first one of the channels, starting at a particular time slot of the first channel;
 scheduling one or more other timing intervals associated with the first channel by providing a specified inter-interval gap between timing intervals of at least a given pair of the timing intervals associated with the first channel; and
 copying the scheduled timing intervals for the first channel to at least one other channel of the plurality of channels.

* * * * *